March 24, 1931. A. S. CAMERON 1,797,544
OPTICAL APPARATUS
Filed May 21, 1928 3 Sheets-Sheet 2
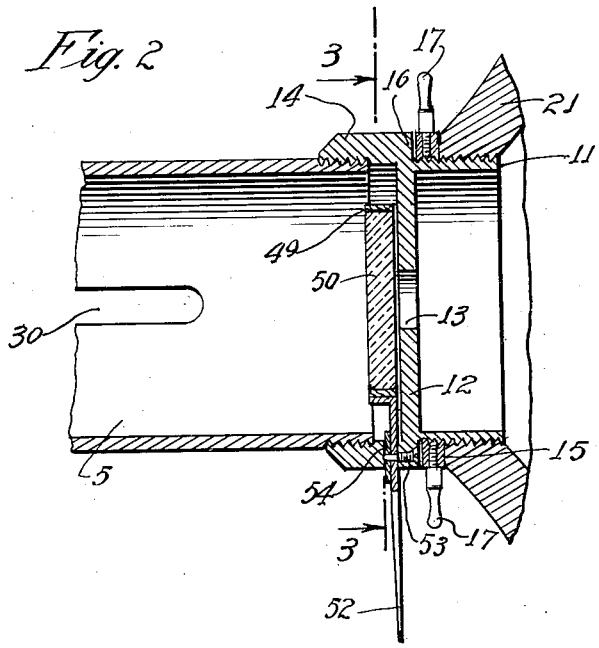
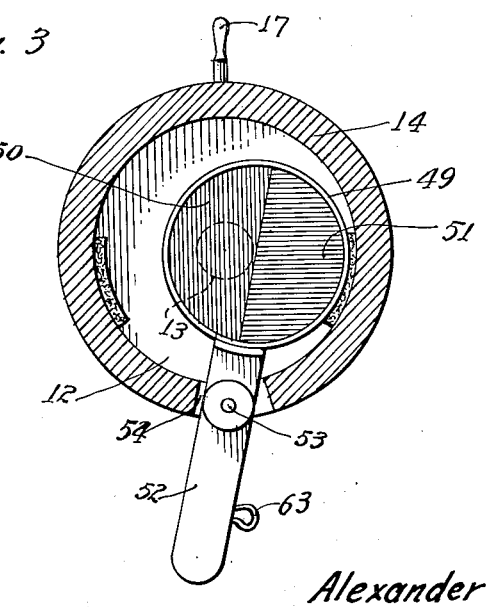
Inventor
Alexander S. Cameron
By E. K. Lundy
Atty.

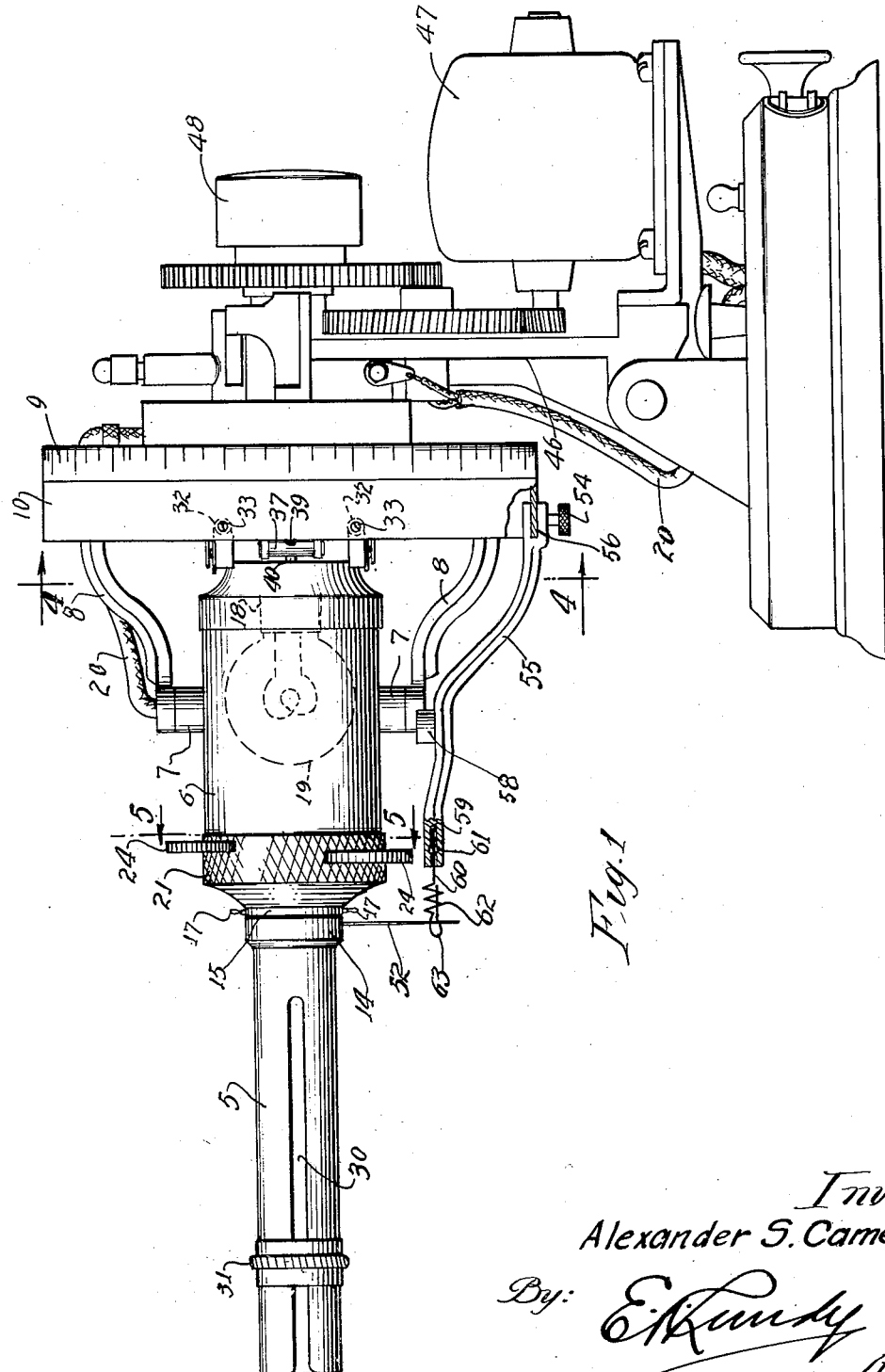

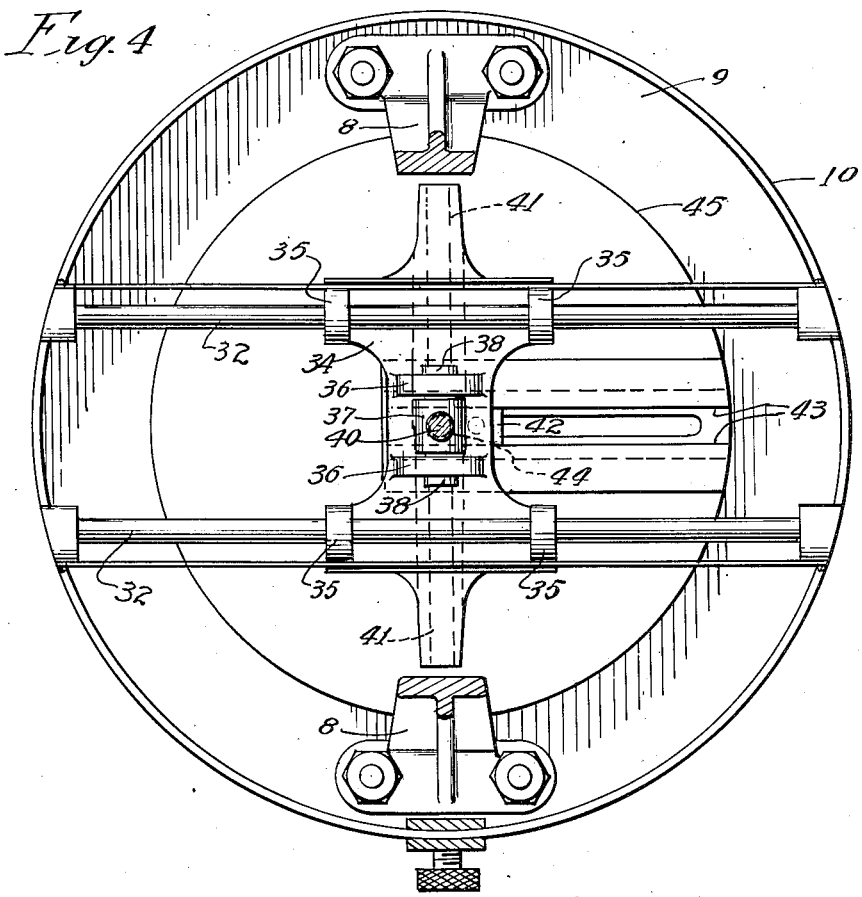
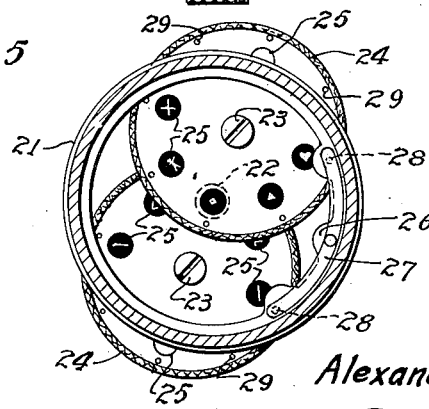

Patented Mar. 24, 1931

1,797,544

UNITED STATES PATENT OFFICE

ALEXANDER S. CAMERON, OF CHICAGO, ILLINOIS, ASSIGNOR TO WILLIAM J. CAMERON, OF CHICAGO, ILLINOIS

OPTICAL APPARATUS

Application filed May 21, 1928. Serial No. 279,274.

My present invention relates to instruments for examining, testing, exercising and treating the eyes, and it has particular reference to a color changing device for use in connection with said instrument for changing the color of an image that is projected upon a screen by the instrument.

Instruments have been devised that project an object or image upon a screen to be observed by the patient, and the construction of the instrument is such that the image is caused to move upon the screen in an unlimited variety of directions. Certain of these instruments are employed to measure the patient's form-fields, and color-fields, and also with the instrument the entire ocular field of the patient may be readily measured and charted. While the instrument is in motion that is, while it is projecting a moving image in a definite predetermined path or orbit, adjustment may be made, without stopping the movement, to alter the form, length and angle or direction of the path or orbit described by the image on the screen. Such an instrument, which is commercially and professionally known as a "myoculator" is disclosed in an application for Letters Patent of the United States that was filed by me January 18, 1928, Serial No. 247,724, for an "instrument for examining, testing, and exercising the eyes."

In the use of an instrument of this character, while moving the image in a given to and fro path upon the screen for exercising the eyes, it is desirable to project the image in color and to change the color of the image. In connection with the foregoing instrument, I have now provided means that will automatically change the color of the projected image while the same and the instrument are in motion. This is done regardless of the direction in which the image is being reciprocated on the screen or the speed at which it is moving. This permits the operator or attendant to adjust the instrument or its projection tube to a desired angle and for a desired length of movement, and after starting the actuating or driving mechanism the attendant need not give attention to the instrument because the proper color changes will be made during the movement of the projection tube.

The mechanism which I have devised for performing the above-mentioned functions has numerous objects, among which are, effectiveness and dependability in performance, readiness of operation, durability in construction, simplicity and sturdiness in the formation and arrangement of the parts, accessibility for the purpose of adjustment, and the whole device is arranged, fabricated, and assembled in a novel and economical manner, which permits the color-changing device being added to the instrument described without materially increasing the manufacturing cost of the apparatus. The device is made so that it may be readily assembled with the instrument already on the market, and may be detached whenever its use is not needed.

I prefer to carry out my invention and to accomplish the numerous objects thereof in substantially the manner hereinafter fully described and as more particularly pointed out in the claims, reference being herein made to the accompanying drawings that form a part of this specification.

In the drawings:—

Figure 1 is a vertical side elevation of an instrument for projecting a moving image upon a screen, the view showing my devices installed thereon for the purpose of changing the color of the image that is projected.

Figure 2 is a fragmentary longitudinal section taken axially through the projection tube and head, and drawn to an enlarged scale.

Figure 3 is a vertical transverse section taken on line 3—3 of Fig. 2 and looking in the direction indicated by the arrows.

Figure 4 is a vertical transverse section on line 4—4 of Figure 1 looking in the direction indicated by the arrows.

Figure 5 is a vertical transverse section on line 5—5 of Figure 1 looking in the direction of the arrows.

It will be understood the drawings are more or less schematic for the purpose of disclosing a typical or preferred embodiment of my invention, and in said drawings I have employed the same reference characters to designate like parts wherever they appear throughout the several views.

The projection tube is designated by the numeral 5 and at or adjacent its inner end there is a housing 6 that is mounted by means of trunnions 7 upon the outer end of a pair of irregular shaped arms 8 that project from the operating head of the apparatus that is in the form of a plate 9 of circular shape having a lateral peripheral flange or rim 10. The head may be moved through suitable mechanism such as has been described in detail in my aforesaid copending application for Letters Patent Serial No. 247,724, and means are also provided for reciprocating the housing and the projection tube, such means being also disclosed in detail in said application and will later be briefly described herein.

At the outer end of the housing is a cap that is internally screw threaded at its outer end to receive the adjacent externally threaded stub 11 of a diaphragm member which is in the form of a transverse wall 12 having a central light aperture 13 that alines with the axis of the housing and projection tube and upon the side of the wall 12 opposite the stub there is a cylindrical collar 14 of substantially the same diameter as the housing and is internally screw threaded to receive the adjacent threaded end of the projection tube 5 that is screwed therein so that it is supported thereby. In order to provide means for locking the diaphragm structure, which carries the color plates in the desired relation to the other parts of the structure, I interpose a threaded ring 15 between the outer end of the housing 6 and the shoulder 16 that is formed by reducing the collar to form the stub so that after the stub has been screwed a suitable distance into the housing and the operating arm has been properly positioned the structure may be locked by screwing the ring against the end or cap of the housing. Handles 17 that project radially from the clamping ring have been provided for convenience in turning the clamping ring in the manner described. The housing is hollow and is provided with an electric socket 18 in which a bulb 19 is mounted and connection is made with a suitable source of electric current through the conductor cable 20.

The outer end of the housing is in the form of a cap 21 that is screwed into the head and is provided centrally with an aperture 22 and upon diametrically opposite sides of the aperture are pivot screws 23 for mounting the shutters or screens 24 that are rotatably mounted so that they may be moved to different positions. There is a plurality of apertures or openings 25 arranged concentrically about the axis of each shutter and the peripheral edges of the shutters are extended through transverse slots in the cap 21 so that the shutters may be rotated from the exterior of the housing. As seen in Figure 5, the shutters overlap and their apertures or openings are arranged so that they may be positioned in alinement with each other as well as in alinement with aperture 22 in the cap. The apertures 25 are in the form of cutout stencils formed in a variety of geometric and conventional shapes as suggested in Figure 5, so that images of different forms or shapes may be projected on the screen to be observed by the patient. At one side of the interior of the cap there is a boss 26 upon which a segmentally shaped ring 27 is secured intermediate the ends of the latter, and the ends of the spring are provided with lateral projections 28 that are adapted to seat in depressions 29 in the adjacent faces of the shutters so as to maintain the latter in their adjusted positions but at the same time permit of their being readily rotated whenever it is desired to change the image.

The projection tube is provided with a longitudinal slot 30 to permit the mounting and the longitudinal adjustment of the condensing lens unit carried by the ring 31 so that the light rays passing through the stencils may be condensed and focused by the lens unit upon the screen to be there observed by the patient.

The projection structure is adapted to be reciprocated or swung upon the trunnions 7 by means of a slide mechanism mounted on the head, which slide mechanism is adjustable for the purpose of controlling the length of the movement of the outer end of the projection tube and the parts are constructed and arranged so that this adjustment may be accomplished very readily while the tube is in motion. Guide rods 32 are mounted in parallel relation to each other on the rim or flange 10 of the head by means of set screws 33 so that they are slightly back of the edge of the flange, and upon these rods a spider 34 is slidably mounted which consists of a casting having guide bosses 35 projecting from one side through the bores of which the rods 32 are inserted. Intermediate the planes of the rods the spider has a pair of lateral lugs 36 between which a swivel block 37 is pivotally mounted by means of shouldered bolts 38. The swivel block has a transverse bore 39 to receive the stud or quill 40 that projects axially from the rear end of the housing 6. Thus it will be seen that whenever the spider is reciprocated upon the rods 32 the connection between the same and the projection structure will cause the latter to be moved upon the trunnions 7, and the length of movement is controlled by the length of the reciprocation of the spider. The head is rotatable upon its axis and by so doing the path described by the projection structure and the image projected upon the screen will be directed at any angle of the three-hundred-sixty degrees (360°) of a circle so that the path traveled by the image may be alined with any meridian of the eye. In the surface of the spider back of the bosses and lugs there is a channel 41 that extends in a plane at a right angle to the plane of movement of the spider, and a sliding block 42 moving in a gib-way or guide tracks 43 has a projection 44 that operates in a channel 41 of the spider 34.

The sliding block 42 and its tracks are mounted upon a disk 45 that is positoned flat against the circular plate 9 of the head inside the rim and has operative connection with the train of gears mounted on the standard 46 and actuated by the motor 47. Connection is also made between the sliding block 42 and hand wheel 48 whereby the length of movement of the block may be adjusted and controlled by moving the slide towards or away from the center of the disk 45 so that the diameter of the circular path traveled by the slide when the disk is rotated will be correspondingly altered. The beforementioned connections may be of any desired or convenient construction, an exemplification of which is disclosed in detail in my aforesaid application for Letters Patent wherein there is also shown means for moving the projection structure in an orbit or circular path to cause a corresponding movement of the image projected upon the screen.

I utilize the reciprocating or pivotal movement of the tube to automatically change the color of the projected image, by providing plates of different colors that are intermittently positioned in front of the aperture 13 of the diaphragm wall 12. This structure is illustrated in enlarged detail in Figures 2 and 3 herein. A ring or bezel 49 is provided that encloses a plurality of, preferably two, translucent or transparent color plates 50 and 51, the former being red and the latter being blue. The bezel 49 is of less diameter than the interior diameter of the collar 14 and it is provided with an elongated lever or arm 52 that is pivoted intermediate its ends upon a shouldered screw 53 that is screwed transversely into the collar 14 as shown in Figure 2, so that the arm extends through the opening 54 in the adjacent segment of said collar. As will be seen in Figure 3 the color plates 50 and 51 are of semi-circular shape and are of such dimensions that when the ring is in either of its positions one of the color plates will be in front of the aperture 13 so that the light from the bulb will pass through the plate and color the image projected upon the screen.

The movement of the color changing device is accomplished by providing an arm 55, one end of which is bifurcated or provided with a slot as shown at 56 to engage the flange of rim 10 of the head and it is locked thereon by the set screw 57. The arm 55, as shown, is irregular and extends in a generally oblique direction from the rim 10 towards one of the trunnions 7 where it is provided with a socket or recessed boss 58 to receive and brace it against said trunnion and its outer end projects towards the extended end of the arm 52 of the color changing device. The arm is provided with a bore 59 extending into its outer end and the straight shank 60 of a yieldable finger is inserted therein and locked in any adjusted position by the set screw 61. This yieldable finger may be of any desired construction and extends past the lever arm 52 of the color changing device so that as the projection structure is moved back and forth the yieldable finger will engage the arm and swing it to one end of its movement and then move past it, and upon the return movement of the projection structure, said finger will engage the lever arm and swing it to the other end of its movement. The yieldable finger herein shown is in the form of a length of wire having a coiled portion 62 at the outer end of its shank and beyond the coil the wire is bent into a closed loop 63 with the end of the wire extending back and inserted inside the coil. It will be understood that the swinging of the lever arm 52 to one side and then to the other side will alternately position the color plates 50 and 51 in front of the diaphragm aperture 13 so that the color of the image projected upon the screen is alternately changed from red to blue while the apparatus is in motion. The color plates perform the function of light modifying elements and because of their differences in color, the intensity of the light passing out of the tube and projected upon the screen is successfully controlled.

Obviously, therefore the structure may be adapted to other apparatus than an optical instrument, and its principle may be used whenever a change of light is desired.

It is obvious that the structure herein disclosed effectively accomplishes the purpose for which it has been designed and the light changing devices, including the collar 14, the diaphragm 12 and stub 11 may be removed from the light projecting parts and the tube 5 may be screwed into the cap of the same. Also the arm 55 is removable so that the instrument may be used without the color changing structure. Modifications of the device are of course contemplated and the specific structure may be altered as desired. The foregoing detailed description and drawing have been given for the purpose of clearness of understanding only, and no unnecessary limitations should be understood therefrom, but the appended claims should be construed as broadly as permissible in view of the prior art.

What I claim is:—

1. A device of the kind described comprising a mobile tube, means for passing light rays therethrough to produce an image upon a screen, an arm pivoted on said tube, a plurality of color plates carried by said arm and movable thereby across the path of the light rays, means for imparting a to and fro movement to the tube to move the image upon the screen, and an obstruction engaged by said arm during the movement of the tube whereby to interpose the color plates successively in the path of the light rays.

2. A device of the kind described comprising a pivotally mounted tube having a lamp in its rear end, means for reciprocably moving the tube upon its pivot, color plates pivotally mounted within said tube, an arm extending from said plates through said tube, and a stationary member adjacent the arm and engaged thereby during the movement of the tube whereby to move the color plates successively in the path of light from the lamp.

3. A device of the kind described comprising a support, a reciprocable tube fulcrumed thereon, a lamp within said tube for projecting a light spot upon a screen, means for actuating said tube whereby to move the light spot upon the screen, an arm pivoted on said tube and extended into and out of the same, a holder on the inner end of said arm, light modifiers supported by the holder and adapted to be alternately positioned in the axis of the path of light, and a stop engaged by the outer portion of the arm during the movement of the tube whereby to alternately shift said light modifiers while the tube is in motion.

4. A device of the kind described comprising a mobile light tube, means adapted to move said tube for projecting a moving image upon a screen, and means for changing the color of the image while in motion, said means consisting of a pair of plates of different colors movable across the path of light, a swinging arm on which said plates are supported modifiers supported by the holder and adapt- to be engaged by the arm during movement of the tube to alternately move the plates into the axis of the path of light.

5. A device of the kind described comprising a mobile image-projector, means for moving the projector to move the image upon a screen, a holder pivoted on the projector for reciprocable movement, light modifiers mounted on said holder, an arm projecting from said holder, and a stop engaged by said arm during movement of the projector to move the modifiers across the path of light.

6. A device of the kind described comprising a mobile image-projector, means for moving the projector to move the image upon a screen, a holder within said projector and pivoted thereon for reciprocable movement, light modifiers carried by said holder, an arm on said holder that extends outside said projector, and a stop engaged by the outer portion of said arm during movement of the projector to move the modifiers across the path of light.

7. A device of the kind described comprising a mobile image-projector, means for moving the projector to move the image upon a screen, a holder within said projector, light modifiers carried by said holder, said projector having a lateral aperture adjacent said holder, an arm fulcrumed intermediate its ends in said aperture and connected at its inner end to said holder, and a stop engaged by the outer portion of said arm during movement of the projector to move the modifiers alternately into the path of light.

Signed at Chicago, in the county of Cook, and State of Illinois, this 30th day of April, 1928.

ALEXANDER S. CAMERON.